Dec. 3, 1940.  E. F. PEVERE ET AL  2,223,938
ALKYLATION OF HYDROCARBONS
Filed May 6, 1939
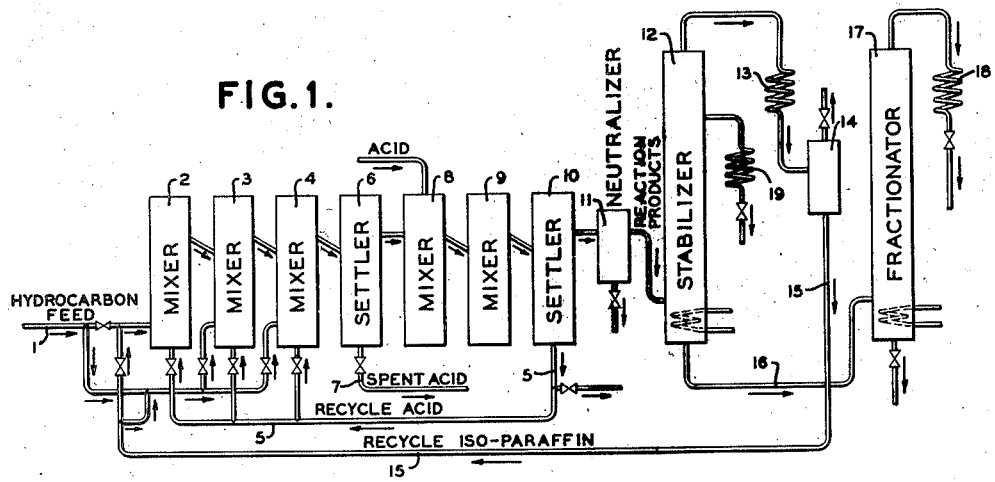
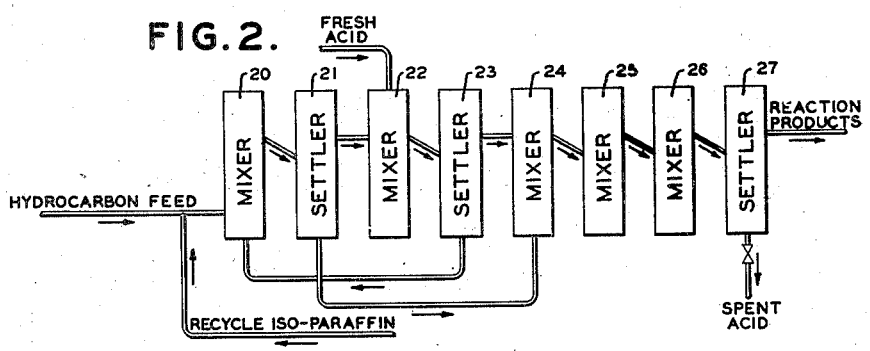
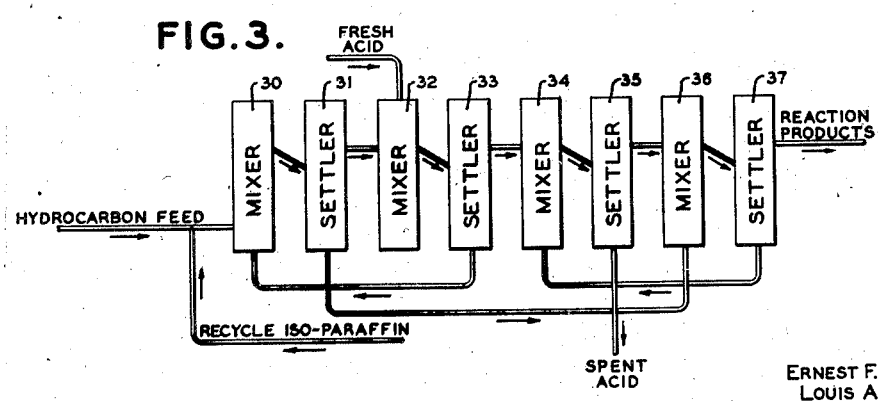
ERNEST F. PEVERE
LOUIS A. CLARKE
GEORGE B. HATCH
INVENTORS
BY
THEIR ATTORNEYS Patented Dec. 3, 1940

2,223,938

UNITED STATES PATENT OFFICE 2,223,938

ALKYLATION OF HYDROCARBONS

Ernest F. Pevere, Beacon, Louis A. Clarke, Fishkill, and George B. Hatch, Beacon, N. Y., assignors to The Texas Company, New York, N. Y., a corporation of Delaware Application May 6, 1939, Serial No. 272,160

6 Claims. (Cl. 196—10)

This invention relates to the alkylation of hydrocarbons in the presence of a catalyst. It is particularly applicable to the alkylation of paraffin hydrocarbons comprising isobutane, with relatively low-boiling point olefins, such as olefins containing from three to four carbon atoms to produce alkylation products within the gasoline boiling range and having a high anti-knock value.

The invention broadly contemplates a continuous method of alkylation wherein paraffin and olefin hydrocarbons are passed through an extended zone of reaction or through a zone of reaction comprising a plurality of reaction stages. The hydrocarbons are passed concurrently with used catalyst through the initial portion of the reaction zone, while fresh catalyst is introduced to the reaction zone at an intermediate point or stage. Used catalyst may be withdrawn from an intermediate point or stage, or from a point or stage substantially beyond that at which the fresh catalyst is introduced and recycled to the initial portion of the reaction zone for contact with the hydrocarbon feed.

The catalyst advantageously comprises strong sulphuric acid having a concentration of about 88 to 100% $H_2SO_4$, and preferably about 94%. However, it is contemplated that other liquid alkylation catalysts effective for the purpose may be employed as, for example, the catalyst prepared by introducing $BF_3$ into water until complete saturation is obtained.

Pending application Serial No. 148,978, filed by Carl Korpi and Arthur R. Goldsby June 18, 1937, describes alkylation of paraffin hydrocarbons, such as isobutane, with olefins in the presence of a liquid catalyst of the sulphuric acid type.

The present invention has to do with modifications in the method of carrying out the alkylation process therein described.

In the continuous operation of the process it is desirable to reuse the catalyst, for example, by recycling the used acid in the system. Some deterioration of the catalyst occurs during the process and this appears most noticeable in those portions or stages of the reaction zone to which the fresh olefin hydrocarbon is introduced. It is desirable, however, to prevent substantial deterioration since it reduces the efficiency of the process.

In accordance with the present invention the olefin hydrocarbons are first brought into contact with used catalyst while fresh makeup catalyst is introduced to the reaction zone at a point substantially beyond that at which the olefin hydrocarbon is introduced. The used catalyst to which the olefin hydrocarbon is initially subjected to contact is advantageously a portion of the liquid catalyst drawn off from an intermediate stage or from a stage substantially beyond that at which the fresh catalyst is introduced.

In order to disclose the invention more fully reference will now be made to the accompanying drawing showing methods of flow adapted to the practice of the invention.

In Fig. 1 the hydrocarbon feed containing paraffin and olefin hydrocarbons is conducted from a source not shown through a pipe 1, which may communicate with one or more mixers 2, 3 and 4, as indicated. Used or recycle catalyst, such as sulphuric acid, from a subsequent stage is introduced to the mixer 2 from a pipe 5. The recycle acid may also be introduced, if desired, to either or both of the mixers 3 and 4.

The hydrocarbon feed and recycle acid is subjected to complete agitation and mixing in the mixer or mixers.

From the mixer 2 the mixture overflows to the mixer 3, wherein it is subjected to further mixing. From mixer 3 it overflows to the mixer 4.

Obviously the arrangement and number of mixers may be varied, as desired, in order to subject the hydrocarbons to contact with the catalyst for the desired length of time.

The overflow from the mixer 4 passes to a settler 6 wherein settling occurs. The spent acid settles to the bottom of the vessel, from which it may be drawn off through a pipe 7.

The hydrocarbon mixture collecting in the upper portion of the settler 6 is drawn off and passed to a mixer 8 wherein it is brought into contact with freshly introduced acid of proper concentration.

After complete mixing the liquid is drawn off to the mixer 9, wherein it is subjected to additional time of contact in order to complete the reaction. The reaction products from the mixer 9 are then drawn off to a settler 10. The used acid settles to the bottom of the settler 10 and from there is drawn off through the pipe 5, previously referred to, and by which means it is returned, all or in part, to the initial reaction zone.

The hydrocarbon reaction products accumulating in the settler 10 are conducted to a neutralizer 11 wherein they are treated with alkali.

The neutralized products are then conducted to a stabilizer 12 and therein subjected to fractionation. Unreacted isoparaffin, such as isobutane, is removed as a distillate through condenser 13 and collected in receiver 14. From receiver 14 it may be drawn off through pipe 15 communicating with pipe 1 previously referred to, and by which means it is returned to the reaction zone.

A side stream comprising normal butane may be removed from the fractionator 12 through condenser 19 and disposed of as desired.

The liquid fraction formed in the bottom of the fractionator 12 is drawn off through pipe 16 to a fractionator 17. From the top of fractionator 17 a gasoline fraction of about 311° F. end point is removed and condensed in a condenser 18. The higher boiling liquid constituents are withdrawn from the bottom of the fractionator.

Referring to Fig. 2, the hydrocarbon feed containing paraffin and olefin hydrocarbons is introduced to a mixer 20 wherein it is subjected to intimate contact with used acid drawn off from a subsequent stage, as will be described later. The mixer overflows to a settler 21. The hydrocarbon layer at the top of the settler 21 overflows to a mixer 22, wherein it is brought into intimate contact with fresh concentrated acid.

The mixture from mixer 22 flows to a settler 23 where separation into a hydrocarbon and an acid layer occurs.

The hydrocarbon layer is conducted to a mixer 24 and therein brought into contact with used acid drawn off from the bottom of the settler 21. This mixture then flows in succession through one or more mixers, such as 25 and 26. From the mixer 26 it passes to a settler 27. The hydrocarbon layer separated in the settler 27 is drawn off from the top thereof as the reaction products or alkylate and may be neutralized and fractionated, as previously described in connection with Fig. 1.

The acid layer formed in the bottom of the settler 27 constitutes the spent acid which may be withdrawn from the system.

The acid layer formed in the bottom of the settler 23 is drawn off, as indicated, and recycled to the mixer 20, and thus provides strong acid with which the hydrocarbon feed is initially treated.

In Fig. 3 the hydrocarbon feed is introduced to a mixer 30, wherein it is brought into contact with used acid from a subsequent stage. This mixture flows to a settler 31 and the hydrocarbon layer from the settler 31 flows to a mixer 32. Fresh acid is introduced to the mixer 32 and the resulting mixture of hydrocarbon and acid flows to a settler 33. The hydrocarbon mixture from the top of the settler 33 passes to a mixer 34 and from there to a settler 35.

The hydrocarbon layer from settler 35 flows to a mixer 36 and from there to a settler 37.

The acid layer formed in the bottom of the settler 33 is drawn off and recycled to the mixer 30, while the acid layer from the settler 31 is drawn off and conducted to the mixer 36.

The acid layer from the final settler 37 is recycled to the mixer 34. The alkylate drawn off from the settler 37 likewise is subjected to neutralization and fractionation, as described in Fig. 1.

Comparing the methods of flow illustrated in the three figures, it will be observed that Fig. 1 shows a countercurrent system in which the acid is introduced to the mixer 8 and flows concurrently with the hydrocarbon charge through mixers 8 and 9. The acid separated in the settler 10 then passes to the mixer 2 and flows concurrently with the fresh hydrocarbon charge through mixers 2, 3 and 4 in series.

Fig. 2 shows a combination of concurrent and countercurrent flow in which stages 1 and 2 (stage 1 comprising vessels 20 and 21 and stage 2 vessels 22 and 23) involve countercurrent flow, while the remaining stages involve concurrent flow.

Fig. 3 shows a countercurrent system in which the acid is introduced to the mixer 32 and passes from settler 33 to the mixer 30, where it is mixed with the fresh hydrocarbon charge. The acid then passes from the settler 31 to the mixer 36 and thence flows countercurrently to the hydrocarbon charge through the last two stages.

It is, of course, contemplated that any number of stages may be employed, either less than or more than those illustrated above. Furthermore, it is contemplated that instead of using a series of individual stages a single long reaction zone of the column or tower type may be employed, with provision for introducing liquid to and withdrawing liquid from a multiple of points throughout its length.

The paraffin hydrocarbons charged to the process should contain a substantial amount of isoparaffins and may be any mixture of hydrocarbons containing isoparaffins which may be alkylated with olefins in the presence of a catalyst. A desirable paraffin feed is one containing low-boiling isoparaffins, preferably isobutane or a mixture containing a large proportion of isobutane. For example, products from the debutanization or fractionation of straight run gasoline, or the product from the stabilization of natural gasoline, containing substantial proportions of isobutane, may be used.

The olefin charge may comprise normally gaseous olefins, normally liquid olefins, or a mixture of both. Olefin containing gas such as produced from cracking plants, and sometimes referred to as "drum gas" can be used. Also gaseous products from dehydrogenation may be employed. A $C_4$ fraction or mixed $C_3$ and $C_4$ fraction from plant cracking gas, constitutes a very satisfactory olefinic charge stock.

The operation is conducted under sufficient pressure to maintain the hydrocarbons undergoing treatment in a liquid condition. Where a gaseous olefin is employed it may be injected in the recycling stream of used acid.

It is desirable to maintain in the alkylation reaction zone isoparaffin substantially in excess of that required for reaction with the olefins. The ratio of isoparaffin to olefins may be between about 3:1 and 5:1 or over. Lower ratios may be employed but preferably in excess of 1:1.

As already indicated, the sulphuric acid catalyst has a concentration of about 90 to 100% $H_2SO_4$. The addition of new acid to an intermediate point in the system, as previously described, serves to fortify the acid and maintain the desired concentration throughout the reaction zone.

The amount of new acid added may be between about one-quarter to five times the volume of olefins. The temperature of reaction maintained in each stage may range from about 30° to 125° F. and preferably about 60 to 90° F.

Obviously many modifications and variations of the invention, as hereinbefore set forth, may be made without departing from the spirit and scope thereof, and therefore only such limitations should be imposed as are indicated in the appended claims.

We claim:
1. In a continuous process for the alkylation of hydrocarbons in which isoparaffin and olefin hydrocarbons are reacted in the presence of a liquid alkylation catalyst during flow through a series of reaction stages, the steps comprising passing the hydrocarbons to an initial stage in the series, subjecting the hydrocarbons to contact therein with a partially spent catalyst withdrawn from a succeeding and intermediate stage, withdrawing used catalyst from said initial stage, passing the initially treated hydrocarbons to said succeeding stage, introducing fresh catalyst to said succeeding stage, subjecting the initially treated hydrocarbons to intimate contact with the fresh catalyst, withdrawing spent catalyst from said succeeding stage for use in the initial stage, passing the treated hydrocarbons from said succeeding stage to a subsequent stage, introducing used catalyst withdrawn from the initial stage to said subsequent stage, subjecting the hydrocarbons in said subsequent stage to contact with said used catalyst, withdrawing spent catalyst from a stage subsequent to that in which the hydrocarbons are treated with fresh catalyst, and withdrawing the hydrocarbon product from the final stage in the series.

2. The method according to claim 1 in which the liquid catalyst comprises sulphuric acid having a concentration of about 90 to 100% $H_2SO_4$.

3. In a continuous process for the alkylation of hydrocarbons in which isoparaffin and olefin hydrocarbons are reacted in the presence of a liquid alkylation catalyst during flow through a series of reaction stages, the steps comprising passing the hydrocarbons to an initial stage in the series, subjecting them to contact therein with partially spent catalyst withdrawn from a succeeding and intermediate stage, withdrawing used catalyst from said initial stage, passing the initially treated hydrocarbons to said intermediate stage, introducing fresh catalyst to said intermediate stage, subjecting the hydrocarbons to intimate contact with the fresh catalyst in the intermediate stage, withdrawing partially spent catalyst from said intermediate stage for use in the initial stage, passing the treated hydrocarbons from said intermediate stage to a final stage, introducing used catalyst withdrawn from the initial stage to said final stage, subjecting the hydrocarbons in the final stage to contact with the used catalyst so introduced, and separately discharging the hydrocarbon product and spent catalyst from said final stage.

4. The method according to claim 3 in which the liquid catalyst comprises sulphuric acid having a concentration of about 90 to 100% $H_2SO_4$.

5. In a continuous process for the alkylation of hydrocarbons in which isoparaffin and olefin hydrocarbons are reacted in the presence of a liquid alkylation catalyst during flow through a plurality of stages in series, the steps comprising passing the hydrocarbons to the first stage in the series, subjecting them to contact therein with partially spent catalyst withdrawn from the second stage, withdrawing used catalyst from the first stage, passing the initially treated hydrocarbons to said second stage, introducing fresh catalyst to the second stage, subjecting the hydrocarbons to intimate contact with the fresh catalyst in the second stage, withdrawing partially spent catalyst from said second stage for return to the first stage, passing the hydrocarbons from the second stage to the third stage, subjecting them to contact therein with partially spent catalyst withdrawn from the fourth and final stage of the series, discharging spent catalyst from said third stage, passing the hydrocarbons from the third to the fourth stage, subjecting the hydrocarbons in the fourth stage to contact with used catalyst withdrawn from the first stage and discharging the hydrocarbon product from said fourth stage.

6. The method according to claim 5 in which the liquid catalyst comprises sulphuric acid having a concentration of about 90 to 100% $H_2SO_4$.

ERNEST F. PEVERE.
LOUIS A. CLARKE.
GEORGE B. HATCH.